(12) United States Patent
Tanahashi

(10) Patent No.: US 6,357,731 B1
(45) Date of Patent: Mar. 19, 2002

(54) VIBRATION DAMPING DEVICE EXHIBITING HIGH DURABILITY OF ELASTIC BODY

(75) Inventor: Hiroaki Tanahashi, Aichi-ken (JP)

(73) Assignee: Tokai Rubber Industries, Ltd. (JP)

( * ) Notice: Subject to any disclaimer, the term of this patent is extended or adjusted under 35 U.S.C. 154(b) by 0 days.

(21) Appl. No.: 09/635,044

(22) Filed: Aug. 4, 2000

(30) Foreign Application Priority Data

Aug. 10, 1999 (JP) ............................................. 11-226068

(51) Int. Cl.$^7$ .......................... F16M 1/00; F16M 11/00; F16M 3/00; F16M 5/00; F16M 7/00

(52) U.S. Cl. .............................. 267/140.4; 267/140.13; 267/292

(58) Field of Search ................................ 267/292, 294, 267/140.11, 140.13, 140.4, 141

(56) References Cited

U.S. PATENT DOCUMENTS

| | | | | |
|---|---|---|---|---|
| 4,607,282 A | * | 8/1986 | Bodin et al. | 267/140.1 |
| 4,632,370 A | * | 12/1986 | Ticks et al. | 267/140.1 |
| 4,641,817 A | * | 2/1987 | Clark et al. | 267/140.1 |
| 4,657,232 A | * | 4/1987 | West | 267/140.1 |
| 4,726,573 A | * | 2/1988 | Hamaekers et al. | 267/140.1 |
| 4,893,797 A | * | 1/1990 | Le Fol et al. | 267/140.1 |
| 4,957,279 A | * | 9/1990 | Thorn | 267/140.5 |
| 5,183,243 A | * | 2/1993 | Matsumoto | 267/140.13 |
| 5,209,460 A | * | 5/1993 | Bouhours et al. | 267/140.14 |
| 5,240,233 A | * | 8/1993 | Kato et al. | 267/140.13 |
| 5,242,158 A | * | 9/1993 | Robic et al. | 267/140.14 |
| 5,516,084 A | * | 5/1996 | Rizzo | 267/140.13 |
| 5,571,263 A | * | 11/1996 | Koester et al. | 267/140.13 |
| 5,630,573 A | * | 5/1997 | Suzuki et al. | 267/140.13 |
| 5,632,472 A | * | 5/1997 | Kato et al. | 267/140.13 |
| 5,964,456 A | * | 10/1999 | Someya | 267/140.13 |
| 6,017,024 A | | 1/2000 | Muramatsu et al. | 267/140.14 |
| 6,131,893 A | * | 10/2000 | Seynaeve et al. | 267/140.13 |

FOREIGN PATENT DOCUMENTS

JP    10-89401    4/1998

* cited by examiner

Primary Examiner—Douglas C. Butler
Assistant Examiner—Devon Kramer
(74) Attorney, Agent, or Firm—Rossi & Associates

(57) ABSTRACT

A vibration damping device is disclosed, which includes: a first mounting member and a second mounting member including a cylindrical portion; an elastic body elastically connecting the first and second mounting member such that the elastic body is bonded at a central portion thereof to the first mounting member and at a peripheral portion thereof to an inner circumferential surface of the second mounting member. The second mounting member includes a constricted part which is integrally formed in the open end portion of the cylindrical portion thereof so as to protrude radially inwardly of the cylindrical portion and so as to extend circumferentially over an entire circumference of the cylindrical portion, and which has the maximum outer diameter not larger than that of the cylindrical portion. The peripheral portion of the elastic body is bonded to respective inner circumferential surfaces of the constricted part and the cylindrical portion of the second mounting member so that the constricted part and the cylindrical portion are elastically connected to the first mounting member via the elastic body.

20 Claims, 5 Drawing Sheets

VIBRATION DAMPING DEVICE EXHIBITING HIGH DURABILITY OF ELASTIC BODY

BACKGROUND OF THE INVENTION

1. Field of the Invention

The present invention relates generally to a vibration damping device including an elastic body elastically connecting two mutually spaced-apart mounting members, which are interposed between two members of a vibration system and are attached at these two mounting members to respective two members of the vibration system so as to flexibly connect these two members or mount one of these members on the other member in a vibration damping manner. More particularly, the present invention is concerned with a vibration damping device which exhibits an improved durability of the elastic body without restricting an effective free length of the elastic body.

2. Description of the Related Art

As one type of a vibration damping device interposed between two members of a vibration system so as to flexibly connect these two members or mount one of these members on the other member in a vibration damping manner, there is know a vibration damping device as disclosed in U.S. Pat. No. 6,017,024, wherein a first metallic mounting member and a second cylindrical metallic mounting member having a cylindrical portion, which are attachable to the respective two members of the vibration system, are spaced apart from each other such that an open end portion of the cylindrical portion of the second mounting member is opposed to the first mounting member, and are elastically connected to each other by an elastic body interposed therebetween. More specifically, the elastic body is bonded at its central portion to the first mounting member and a its circumferential surface to the inner circumferential surface of the cylindrical portion of the second mounting member. The vibration damping device is favorably used as an engine mount of a motor vehicle, for example.

This type of the vibration damping device is likely to suffer from a problem of cracking or other defects which occurs at the circumferential portion of the elastic body, which is bonded to the inner circumferential surface of the open end portion of the second mounting member, resulting in deterioration of durability of the elastic body. As a method to cope with this problem, there is proposed to modify the vibration damping device such that the second mounting member is formed at the open end portion of its cylindrical portion with an outward flange in order to increase a bonding surface area of the elastic body contact with respect to second mounting member, or alternatively the second mounting member includes a tapered portion which has a diameter gradually increasing toward the open end portion of the second mounting member in order to ease stress-concentration on a local portion of the elastic body. However, the use of such an outward flange or a tapered portion formed in the open end portion of the second cylindrical mounting member inevitably leads to an increase only in the diameter of the one open end portion of the second cylindrical mounting member. Since a space for accommodating the vibration damping device is limited, the diameter of the cylindrical portion of the second mounting member other than the outward flange or the tapered portion of the second mounting member is accordingly restricted, resulting in undesirable decreases in an entire volume of the elastic body and decrease in a substantial effective free length of the elastic body, in other words, the length of the elastic body connecting the first and second mounting members. Thus, the use of the outward flange or the tapered portion may possibly result in adverse influence on a spring characteristic of the elastic body. In particular, the above-indicated outward flange and the tapered portion of the second mounting member are not employable in the case where the second mounting member is fixed in the bracket such that the open end portion of the second mounting is press-fitted in the fixing bore of the bracket.

In view of the above, there has been desired to provide a vibration damping device which assures an improved durability of the circumferential portion of the elastic body which is bonded to the inner circumferential surface of the open end of the second mounting member, without increasing the diameter of the open end of the second mounting member. To meet this requirement, it is considered to modify the vibration damping device such that the open end portion of the second mounting member extends axially outward direction, so that a circumferential fillet is provided at an edge of the circumferential portion of the elastic body such that the fillet extends from the edge axially outwardly along the inner circumferential surface of the axially outward extending portion of the second cylindrical mounting member, and is bonded to this inner circumferential surface. In this case, however, the second mounting member radially outwardly disposed on the elastic body protrudes axially outward from the circumferential portion of the large-diameter portion of the elastic body. This leads to difficulty in opening the mold for molding the elastic body in a direction perpendicular to an axial direction thereof. Therefore, a degree of freedom in arranging the configuration, structure, or the like of the elastic body is significantly decreased, due to the above-indicated restriction in construction of the mold for molding the elastic body.

For instance, when the mold for molding the elastic body consists of a pair of mold halves which are butted to each other in the axial direction thereof to define therebetween a mold cavity for forming the elastic body, the configuration of the elastic body is inevitably restricted such that the diameter of the elastic body is not smaller than that of the first mounting member. This makes it impossible to protrude the peripheral portion of the first mounting member in the direction perpendicular to the axial direction from a circumferential portion of the central portion of the elastic body which is bonded to the first mounting member. That is, it is impossible to provide a circumferential fillet in an edge of the circumferential portion of the central portion of the elastic body, which edge is bonded to the peripheral portion of the first mounting member, making it difficult to provide a structure like the circumferential fillet for easing stress-concentration to the bonding portion of the elastic body with respect to the peripheral portion of the first mounting member. This drawback may possibly lead to deterioration of the durability of the elastic body.

SUMMARY OF THE INVENTION

The present invention was developed in the light of the above situation. It is therefore an object of the present invention to provide a vibration damping device having a novel structure, which is compact in size without increase of a diameter of the second mounting member, and which is capable of providing a sufficiently large free length of the elastic body. The vibration damping device also ensures an excellent durability of the elastic body, by avoiding stress concentration on local portions of the elastic body at which the elastic body is bonded to the first and second mounting members.

The above object of the invention may be achieved according to the principle of the present invention, which provides a vibration damping device interposed between two members of a vibration system for elastically connecting these two members in a vibration damping manner, the vibration damping device comprising: (a) a first mounting member and a second mounting member including a cylindrical portion, which are spaced apart from each other such that an open end portion in one of axially opposite ends of the cylindrical portion of the second mounting member is opposed to the first mounting member, and which are attachable to the two members of the vibration systems, respectively; (b) an elastic body elastically connecting the first and second mounting member such that the elastic body is bonded at a central portion thereof to the first mounting member and at a peripheral portion thereof to an inner circumferential surface of the second mounting member; and (c) a constricted part being integrally formed in the open end portion of the cylindrical portion of the second mounting member such that the constricted part protrudes radially inwardly of the cylindrical portion and extends circumferentially over an entire circumference of the cylindrical portion, and that the constricted part has the maximum outer diameter thereof not larger than that of the cylindrical portion, the peripheral portion of the elastic body being bonded to respective inner circumferential surfaces of the constricted part and the cylindrical portion of the second mounting member so that the constricted part and the cylindrical portion are elastically connected to the first mounting member via the elastic body.

In the vibration damping device according to the present invention, the provision of the constricted part formed in the upper open end portion of the second mounting member permits an increase in area of a surface of the elastic body bonded to the upper open end portion of the second mounting member, and a decrease in degree of concentration of stress to the bonding surface of the elastic body with respect to the upper open end portion of the second mounting member, upon deformation of the elastic body. This arrangement results in an improved durability of the elastic body and the resultant increase of the durability of the vibration damping device.

In the present mode of the invention, the constricted part is formed only in the upper open end portion of the second mounting member where the elastic body is likely to suffer from problems of the stress-concentration and cracking or other defects, as well as the maximum outer diameter of the constricted part is made not larger than the outer diameter of the cylindrical portion of the second mounting member, so that the vibration damping device constructed according to the preset invention is made compact in size. Further, the elastic body is bonded not only to the constricted part but also to the cylindrical portion having the outside diameter larger than that of the constricted part. This arrangement is effective to obtain a sufficient volume of the entire of the elastic body and an effective free length of the elastic body, thereby ensuring a further improved durability of the elastic body and a high degree of freedom in selecting materials of the elastic body and in arranging spring characteristics of the elastic body. The cylindrical portion of the second mounting member may be open in one of axially opposite ends thereof, or alternatively may be open in both axially opposite ends thereof.

For improved efficiency and reduced cost of manufacture of the second mounting member, it is preferable that the second mounting member is made of metallic materials such as steel by pressing. For assuring the above-indicated technical advantages of the present invention, the cylindrical portion as well as the constricted part of the second mounting member need to be substantially elastically connected to the first mounting member via the elastic body interposed therebetween. That is, respective portions of the elastic body bonded to the inner surfaces of the constricted part and the cylindrical portion of the second mounting member are both required to extend directly from the respective inner surfaces toward the first mounting member in a generally diametrical direction so that both portions of the elastic body are effectively elastically deformed upon application of the vibrational load to the vibration damping device.

According to one preferred form of the invention, the elastic body includes a connecting portion adapted to connect the first and second mounting members and having a circumferential surface serving as a free surface. The free surface having a tapered cylindrical shape extending axially outwardly and radially inwardly from the open end portion of the constricted part of the second mounting member. The vibration damping device constricted according to this preferred form of the invention is capable of obtaining the effective free length of the elastic body in the connecting portion of the elastic body, while avoiding an increase in diameter of the second mounting member. Further, the present vibration damping device is capable of reducing a tensile stress generated in the elastic body when the first and second mounting members are moved toward each other in the axial direction due to an application of the vibrational load in the axial direction to the vibration damping device, resulting in a further improved durability of the elastic body and the vibration damping device. More preferably, the elastic body may be provided with a cavity open in a large-diameter end face thereof. In this arrangement, occurrence of the tensile stress in the elastic body due to the axial displacement of the first and second mounting members close to each other, is advantageously eliminated or reduced, resulting in a further improved durability of the elastic body or the vibration damping device.

In one advantageous form of the above preferred form of the invention, the elastic body has a small-diameter portion and is bonded at an end face of the small-diameter portion thereof to the first mounting member, while the first mounting member has a protruding portion protruding in a radially outward direction thereof from a peripheral portion of the end face of the small-diameter portion of the elastic body. The elastic body further including a circumferential filled formed in the peripheral portion of the end face of the small-diameter portion thereof so as to extend radially outwardly from the peripheral portion with a curved surface and so as to be bonded to the protruding portion of the first mounting member. In this arrangement, the stress-concentration on the peripheral portion of the end face of the small-diameter portion is advantageously reduced owing to the provision of the fillet, resulting in a further improved durability of the elastic body. In this preferred form of the invention, the elastic body has a tapered circumferential surface which extends axially outwardly and radially inwardly from the upper open end face of the second mounting member toward the first mounting member 12, permitting a use of a mold which is opened in a diametric direction thereof, in other words, which consists of a plurality of mold parts which are butted together at a parting plane extending in an axial direction of the mold, for forming an integral vulcanized product wherein the elastic body is bonded to the first and second mounting member in the vulcanization process of a rubber material for forming the elastic body in the mold. It is noted that the use of the mold which is opened in the diametric direction and which is simple in construction, may facilitate formation of the circumferential fillet provided in the bonding portion of the elastic body with respect to the first molding member, that is, the peripheral portion of the upper end face of the small-diameter portion of the elastic body.

According to another preferred form of the invention, the first mounting member includes an axially protruding portion which protrudes toward and is embedded in the elastic body such that the elastic body is bonded to the protruding portion. In this form of the invention, the provision of the protruding portion in the elastic body effectively restricts an irregular deformation of the elastic body, so that the vibration damping device of the present form of the invention can exhibit a desired vibration damping effect based on the elastic characteristics of the elastic body, with high stability. Further, the provision of the axially protruding portion integrally formed with the first mounting member permits that the first and second mounting members are opposed to each other over an increased area where the first and second mounting members are directly connected to each other by the elastic body interposed therebetween.

According to a further preferred form of the invention, the elastic body includes a first and a second axial portion located radially inwardly of the constricted part and the cylindrical portion of the second mounting member, respectively, the first and second axial portions having respective axial lengths: L and M, as measured in a cylindrical cross section taken along a cylindrical plane tangent to a radially inner end portion of the constricted part, which axial lengths: L and M satisfy the following inequality: $0.5 \leq M/L \leq 3.0$.

In the present form of the invention, the first and second axial portions of the elastic body are suitably dimensioned so as to satisfy the above-indicated inequality. This arrangement makes it possible that the vibration damping device more effectively achieves both of the improved durability of the elastic body owing to the provision of the constricted part, and the sufficient volume and effective free length of the elastic body owing to the provision of the cylindrical portion of the second mounting member and the resultant high degree of freedom in determining a material of or a damping characteristic of the vibration damping device. More preferably, the axial lengths: L and M of the first and second axial portions of the elastic body are arranged to satisfy the following inequality: $1.0 \leq M/L \leq 2.0$.

According to a yet further preferred form of the invention, the constricted part of the second mounting member has an inner circumferential surface which entirely comprises an inclined or a curved surface extending in the axial direction of the second mounting member, and which comprises no plane surface extending in a direction perpendicular to the axial direction. This arrangement is effective to avoid an undesirable increase of the diameter of the second mounting member due to the presence of the plane surface extending in the direction perpendicular to the axial direction, and undesirable increase of an inactive region of the elastic body where the elastic body is not deformed upon application of the vibrational load between the first and second mounting members. Thus, the present form of the invention permits a reduction in size of the vibration damping device and an improved damping characteristic of the vibration damping device, more effectively.

Preferably, the constricted part and an intersection of the constricted part with the cylindrical portion of the second mounting member axially extends over axial lengths thereof with a continuously curved inner circumferential surface having no bending portion. This arrangement effectively eliminates or reduces occurrence of stress-concentration on a local portion of the elastic body bonded to the inner circumferential surface of the constricted part of the second mounting member. In this respect, the bending portion is interpreted as an intersection of two surfaces at which there are no common lines tangents to these two surfaces.

According to a still further preferred form of the invention, the vibration damping device further comprises a fluid chamber formed in an interior space of the cylindrical portion of the second mounting member, the fluid chamber being partially defined by the elastic body and being filled with a non-compressible fluid. In this form of the present invention, the vibration damping device exhibits further improved vibration damping effect based on a resonance or flow of the fluid of the non-compressible fluid filling the fluid chamber. Further, the fluid chamber can be formed with ease, by effectively utilizing an interior space of the cylindrical portion of the second mounting member, and by closing the open end of the cylindrical portion of the second mounting member with the elastic body.

According to a yet another preferred form of the invention the vibration damping device further comprises a bracket member which is attachable to one of the two members of the vibration system for attaching the second mounting member to the one member of the vibration system, the bracket member including a fixing bore, and the second mounting member being fixed in the fixing bore such that the second mounting member is axially press-fitted in the fixing bore on the side of the constricted part thereof. In this form of the invention, since the constricted part of the second mounting member is dimensioned to have the maximum outer diameter not larger than that of the cylindrical portion of the second mounting member, the second mounting member is easily assembled in the fixing bore of the bracket by press-fitting the second mounting member from its constricted part. Further, the constricted part is provided only in the axially open end portion of the second mounting member, so that the cylindrical portion of the second mounting member effectively provides a sufficient area required for effectively press-fitting the second mounting member in the fixing bore of the bracket. For avoiding undesirable deformation of the constricted part during operation of press-fitting the second mounting member in the fixing bore of the bracket, the constricted part of the second mounting member is preferably dimensioned so as to have the maximum outer diameter (e.g., an outer diameter of the upper open end of the constricted part) which is slightly smaller than the outer diameter of the cylindrical portion of the second mounting member.

According to still another preferred form of the invention, the vibration damping device further comprises: a calking portion which is integrally formed in the other one of axially opposite ends of the cylindrical portion of the second mounting member, which is opposite to the constricted portion of the second mounting member in the axial direction, the calking portion having a diameter larger than that of the cylindrical portion of the second mounting member; and a closure member which is fixed at an peripheral portion thereof to the calking portion by calking so as to fluid tightly close the other open end portion of the cylindrical portion of the second mounting member, thereby forming in an interior space of the cylindrical portion a fluid chamber partially defined by the elastic body and filled with a non-compressible fluid, the second mounting member being positioned with respect to the bracket member in the axial direction thereof such that the calking portion is held in abutting contact with an open end face of the fixing bore of the bracket member. This arrangement permits an effective formation of the fluid chamber in the interior space of the cylindrical portion of the second mounting member, and a high-precise positioning of the second mounting member with respect to the bracket member, by efficiently utilizing the calking portion integrally formed in the other of axially opposite ends of the cylindrical portion of the second mounting member.

BRIEF DESCRIPTION OF THE DRAWINGS

The above and other objects, features and advantages of the present invention will be better understood by reading the following detailed description of presently preferred embodiments or modes of the invention, when considered in connection with the accompanying drawings in which.

DETAILED DESCRIPTION OF THE PREFERRED EMBODIMENTS

Figure 1:
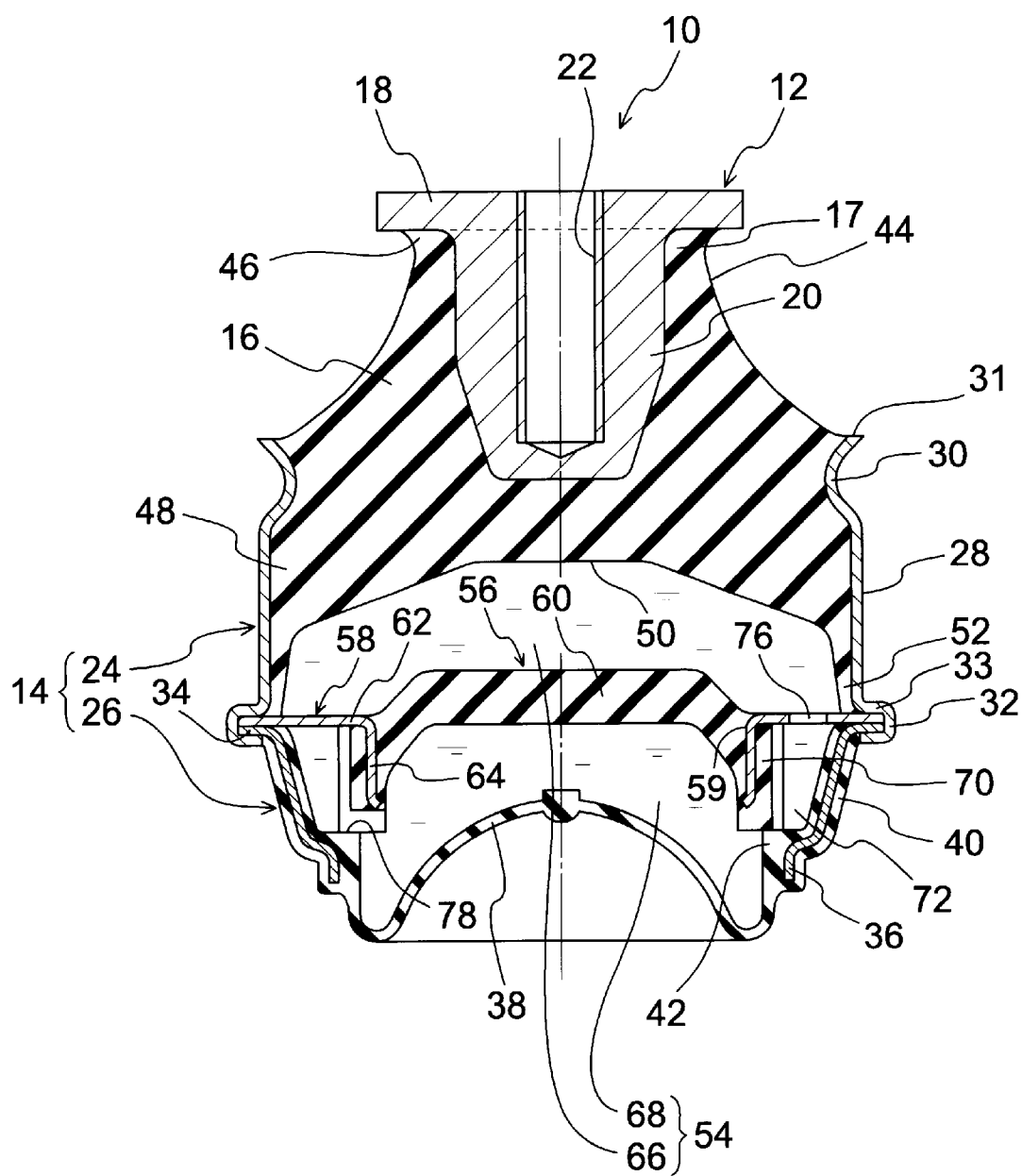
FIG. 1 is an elevational view in axial or vertical cross section of a vibration damping device in the form of an engine mount constructed according to one embodiment of the invention, taken along line 1—1 of FIG. 3.

Referring first to FIG. 1, there is shown one embodiment of a vibration damping device of the present invention in the form of an engine mount 10 for use on an automotive vehicle. The engine mount 10 includes a first mounting member 12 and a second mounting member 14 which are both made of metallic materials and which are disposed in mutually opposed and spaced-apart relationship with each other. The first and second mounting members 12, 14 are elastically connected to each other by an elastic body 16 made of a rubber material. The present engine mount 10 is installed on the automotive vehicle such that the first mounting member 12 is attached to a power unit (not shown), while the second mounting member 14 is attached to a body of the vehicle (not shown), so that the power unit which includes an engine is mounted on the vehicle body in a vibration damping manner. When the engine mount 10 is installed on the vehicle as described above, a load or weight of the power unit acts between the first and second mounting members 12, 14 in an axial direction of the mount 10, that is, in the vertical direction as seen in FIG. 1. The engine mount 10 receives a vibrational load primary in the vertical direction.

The first mounting member 12 is made of a hard material such as a metallic material like steel. The first mounting member 12 includes a disk shaped portion 18 formed in its axially upper end portion so as to extend in a direction perpendicular to the axial direction of the engine mount 10, and a solid cylindrical protruding portion 20 which is formed integrally with the disk shaped portion 18 so as to extend axially downward direction from the central portion of the disk shaped portion 18. The protruding portion 20 has a tapered portion at its axially lower end portion. The tapered portion has a diameter gradually reducing toward the axially lower end of the protruding portion 20. The first mounting member 12 further includes a screw hole 22 which is formed in the central portion of the protruding portion 20 along the axis of the engine mount 10 and open in the upper end face of the disk shaped portion 18. The screw hole 22 is adapted to receive a screw (not shown) for attaching the first mounting member 12 to the power unit of the vehicle.

Figure 3:
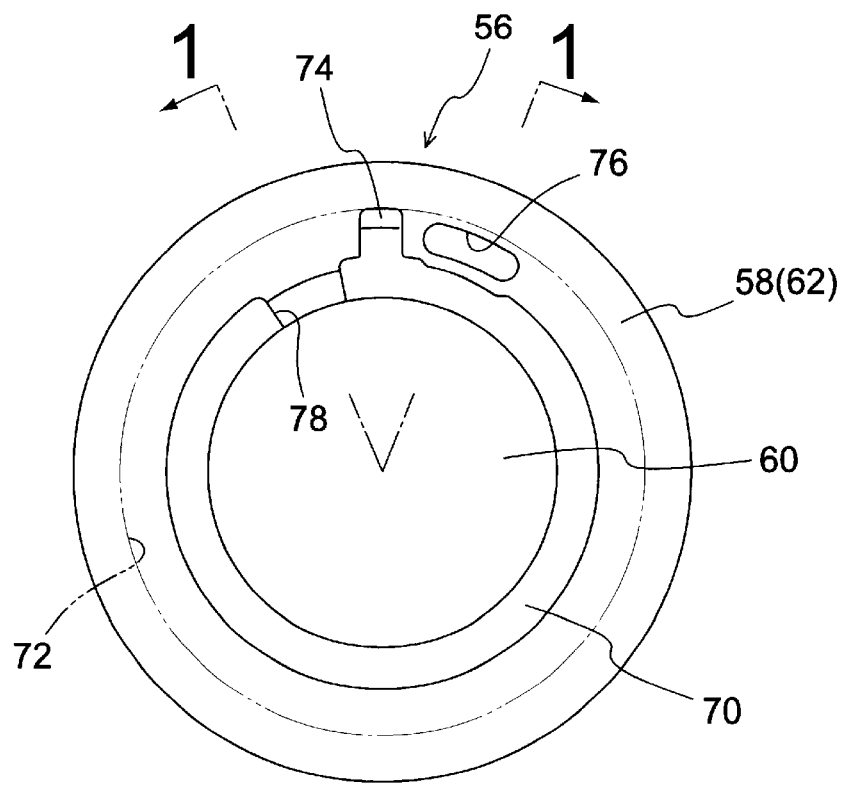
FIG. 3 is a bottom plane view of a partition member of the engine mount of FIG. 1.

The second mounting member 14 is a generally cylindrical member with a relatively large diameter including an upper sleeve 24 having a relatively large diameter and a lower sleeve 26 having a tapered shape with a relatively large diameter. The upper and lower sleeves 24, 26 are preferably formed by pressing of a hard material such as metal, e.g., steel pipe or plate. The upper sleeve 24 includes an axially intermediate portion in the form of a straight tube which extends in the axial direction with generally constant inner and outer diameter, serving as a cylindrical portion 28 of the second mounting member 14. The cylindrical portion 28 has a constricted part 30 which is formed integrally at an axially upper end portion of the cylindrical portion 28. The constricted part 30 protrudes radially inwardly of the upper sleeve 24 with an arc shape as seen in axial cross section, and which extends in the circumferential direction over a circumference of the upper sleeve 24 with a generally constant shape as seen in axial cross section, so as to form an annular curved projection. That is, the constricted part 30 constitutes an upper open-end portion of the upper sleeve 24. As is apparent from FIG. 3, the thus formed upper sleeve 24 is processed by cutting so that an axially upper end face of the constricted part 30 is cut in the direction perpendicular to the axial direction, thereby providing a plane surface 31w ith high accuracy in the open end face of the upper sleeve 24. The flat surface extends in a direction perpendicular to the axial direction of the upper metallic member 24.

The constricted part 30 includes an axially lower-side portion and an axially upper-side portion. The lower-side portion extends axially upwardly and radially inwardly from the upper open end of the cylindrical portion 28, so that the constricted part 30 has its smallest diameter at an axially upper end of its lower-side portion. The upper-side portion extends axially upwardly and radially outwardly from the axially upper end of the lower-side portion. This arrangement effectively provides a tapered portion extending axially upwardly and radially outwardly at the upper open end of the upper sleeve 24. The constricted part 30 is further arranged so as to have a diameter not larger than that of the cylindrical portion 28.

The cylindrical portion 28 also has an annular calking part 32 which is integrally formed at its lower open end. The calking part 32 extends radially outwardly from the outer circumferential surface of the cylindrical portion 28 so as to form an annular shoulder 33, and is bent at its outer peripheral portion in the axially downward direction. Thus constructed calking part 32 has an outer diameter larger than those of the constricted part 30 and the cylindrical portion 28 of upper metallic member 24.

The lower sleeve 26 has a tapered shape with a diameter gradually decreasing toward its lower open end. That is, the lower sleeve 26 has a large-diameter portion on the side of upper open end and a small-diameter portion on the side of lower open end. The large-diameter portion of the lower sleeve 26 has a diameter substantially equal to that of the cylindrical portion 28 of the upper sleeve 24. The lower sleeve 26 has a flange portion 34 formed integrally at its upper open end so as to extend radially outwardly. The flange portion 34 has an outer diameter larger than that of the cylindrical portion 28 of the upper sleeve 24. The lower sleeve 26 further has an annular support portion 36 having "L"-shape in cross section formed integrally at its lower open end. The annular support portion 36 has a radially inward flange part and a cylindrical part extending axially downwardly from the inner periphery of the inward flange part.

On the side of the lower open end of the lower sleeve 26, there is disposed a flexible diaphragm 38 as a flexible closure member in the form of a fluid-impermeable flexible layer. The flexible diaphragm 38 is formed of a thin rubber layer so as to be easy deformable, and is bonded at its peripheral portion to the annular support portion 36 in the process of vulcanization of a rubber material for forming the flexible diaphragm 38, whereby the lower open end of the lower sleeve 26 is fluid-tightly closed by the flexible diaphragm 38. The lower sleeve 26 is covered by a sealing rubber layer 40 which is bonded to the substantially entire area of the inner and outer circumferential surfaces of the lower metallic member 26 and which is formed integrally with the flexible diaphragm 38, upon vulcanization of a rubber material for forming the sealing rubber layer 40. To the annular support portion 36, there is also bonded an annular bottom rubber wall 42 such that the bottom rubber wall 42 protrudes radially inwardly from the support portion 36 by a given radial distance and integrally formed with the flexible diaphragm, upon vulcanization of a rubber material for forming the annular bottom rubber wall 42.

The upper and lower sleeves 24, 26 are superposed on each other in the axial direction such that the flange portion 34 of the lower sleeve 26 is fluid-tightly secured by calking to the calking portion 32 together with the sealing rubber layer 40 and a partition member 58 which will be described. Thus, the upper and lower sleeves 24, 26 are superposed on and connected to each other at the calking portion 32, thereby providing the second mounting member 14 which has a generally cylinder shape with a relatively large diameter as a whole. It is noted that the thus constructed second mounting member 14 has its maximum diameter at the calking portion 32 in which the upper and lower sleeves 24, 26 are secured to each other.

On the side of the upper open end of the second mounting member 14 (on the axially upper side of the second mounting member 14 as seen in FIG. 1) there is disposed the first mounting member 12 such that the first and second mounting members 12, 14 are opposed to each other with a suitable axial spacing therebetween, and are disposed in a co-axial relationship with each other. In the present embodiment, particularly, the first mounting member 12 has the protruding portion 20 protruding toward the upper open end of the second mounting member 14. The protruding portion 20 is projected into the second mounting member 14 by a given axial distance, so that the axially end portion of the protruding portion 20 is disposed radially inwardly of the constricted part 30. This arrangement makes it possible that inner circumferential surfaces of both of the constricted part 30 and the cylindrical portion 28 of the upper metallic member 24 are directly opposed in the radial direction or in a direction inclined to the axial direction at a given angle, to the protruding portion 20 and other portions of the first mounting member 12 over a sufficiently wide range.

The elastic body 16 interposed between these first and second mounting members 12, 14 which are spaced apart from each other in their axial direction, i.e., the primary load receiving direction, has a generally frustoconical shape. The elastic body 16 is bonded at its small-diameter portion to the first mounting member 12 in the process of vulcanization of the rubber material of the elastic body 16, such that the outer peripheral portion of the disk shaped portion 18 is fitted on the end face of the small-diameter portion 17 of the elastic body 16, while the protruding portion 20 embedded within the small-diameter portion of the elastic body 16. A large-diameter end portion 48 of the elastic body 16 has a generally constant diameter over a suitable axial length. The elastic body 16 is also bonded at an outer circumferential surface of its large-diameter end portion 48 to the inner circumferential surface of the upper sleeve 24 of the second mounting member 14 in the vulcanization process. Thus, the first mounting member 12, second mounting member 14 and elastic body 16 are formed into an integral intermediate product by means of the vulcanization, so that the upper open end of the second mounting member 14 is fluid-tightly closed by the elastic body 16.

The elastic body 16 constructed as described above, includes an axially upper portion protruding axially upwardly from the upper open end of the second mounting member 14 functioning as a connecting portion. The outer circumferential surface of the axially upper portion of the elastic body serves as a free surface in the form of a tapered circumferential surface 44. In this respect, the free circumferential surface indicates the circumferential surface of the elastic body 16 whose elastic deformation is not restricted. The tapered circumferential surface 44 has a lower end which is bonded to the upper end of the constricted part 30 so as to be flash with the upper end of the constricted part 30 and so as not to be located axially downward of the constricted part 30. The tapered circumferential surface 44 extends radially inwardly from its lower end with a slight radial distance, and then extends axially outwardly and radially inwardly toward the first mounting member 12 so as to have an inwardly curved shape. The upper end face of the elastic body 16 (the smallest diameter portion) has a diameter which is made larger than that of the protruding portion 20 of the first mounting member 12, and which is made smaller than that of the disk shaped portion 18 of the first mounting member 12. Thus, the disk shaped portion 18 extends radially outwardly of the upper end of the elastic body 16 by a slight amount of a radial distance. Along the peripheral portion of the upper end of the elastic body 16 at which the elastic body 16 is bonded to the first mounting member 12, there is provided an integrally formed circumferential fillet 46 such that the fillet portion 46 extends axially upwardly and radially outwardly toward the disk shaped portion 18 of the first mounting member 12. The provision of the fillet portion 46 is effective to reduce the contact angle between the peripheral portion of the upper end of the elastic body 16 and the disk shaped portion 18 of the first mounting member 12.

The large diameter end portion 48 of the elastic body 16 has a generally cylindrical shape with a generally constant diameter and with a sufficiently large axial length. The large diameter end portion 48 is disposed radially inwardly of the upper sleeve 24 of the second mounting member 24 while extending in the axially downward direction from the upper open end of the upper sleeve 24 with the sufficient axial length. This makes it possible that the large diameter end portion 48 of the elastic body 16 is bonded to the inner circumferential surface of the upper sleeve 24, in particular, the inner circumferential surfaces of the cylindrical portion 28 as well as the constricted part 30 over a sufficiently large area. The elastic body 16 has a recess 50 having a large diameter, which is open in the large diameter end face of the elastic body 16, thereby reducing a tensile stress generated in the elastic body 16 upon acting the weight of the power unit on the elastic body, resulting in an improved durability of the elastic body 16.

Figure 2:
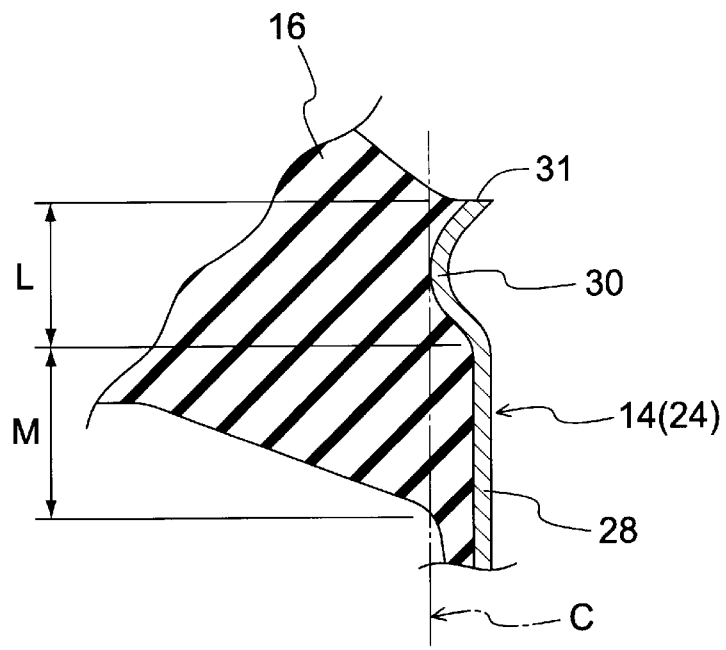
FIG. 2 is a fragmentary enlarged view in axial or vertical cross section showing a principal part of the engine mount of FIG. 1.

In particular, the axial length of the large-diameter end portion 48 of the elastic body 16 is made larger than that of the constricted part 30 of the upper sleeve 24. This makes it possible that the large-diameter end portion 48 is bonded to both of the constricted part 30 and the cylindrical portion 28 with a sufficient contact area. As shown in FIG. 2, the elastic body 16 includes a first and a second axial portion located radially inwardly of the constricted part and the cylindrical portion of the second mounting member, respectively. The first and second axial portions have respective axial lengths: L and M, as measured in a cylindrical cross section taken along a cylindrical plane: C tangent to the radially inner end portion of the constricted part, which axial lengths: L and M satisfy the following inequality: $0.5 \leq M/L \leq 3.0$., more preferably, $1.0 \leq M/L \leq 2.0$.

In the present embodiment, a sealing rubber layer 52 is bonded to the axially lower portion of the upper sleeve 24 where the large-diameter end portion 48 is not bonded, and is integrally formed with the elastic body 16. It is noted that the sealing rubber layer 52 is not a substantive member for transmitting vibrations. Namely, the sealing rubber layer 52 should be considered as a member independent of the elastic body 16 which is elastically deformed upon application of a vibrational load between the first and second mounting members 12, 14.

In the thus constructed engine mount 10, the elastic body 16 and the flexible diaphragm 38 closing the upper and lower open ends of the second mounting member 14 cooperate with the second mounting member 14 to define a fluid chamber 54 filled with a suitable non-compressible fluid. The non-compressible fluid filling the fluid chamber 54 is preferably selected from among water, alkylene glycol, polyalkylene glycol and silicone oil, or a mixture thereof, for example. In particular, to assure an excellent vibration damping effect of the engine mount 10 based on a flow or a resonance of the non-compressible fluid, the non-compressible fluid desirably has a viscosity not higher than 0.1 Pa·s. The filling of the non-compressible fluid to the fluid chamber 54 is advantageously conducted by assembling by calking the upper sleeve 24 bonded to the elastic body 16 and the lower sleeve 26 bonded to the flexible diaphragm 38 in a mass of the selected non-compressible fluid.

The fluid chamber 54 accommodates a partition member 56. The partition member 56 includes a metallic support plate 58 having a generally annular shape and a rubber plate 60 having a generally disk-like shape with a suitable wall thickness. The rubber plate 60 is bonded at its peripheral portion to the inner circumferential surface of the metallic support plate 58, during vulcanization of a rubber material of the rubber plate 60, so that a central opening 59 of the metallic support plate 58 is fluid-tightly closed by the rubber plate 60. Thus, the metallic support plate 58 and the rubber plate 60 are formed into an integral vulcanized product in the form of the partition member 56. More specifically, the metallic support plate 58 includes a width plate 62 having an annular shape and a length plate 64 having a cylindrical shape and extending from the inner circumferential surface of the width plate 62 in the axially downward direction. The metallic support plate 58 is an annular member made of a metallic material by pressing and extending in its circumferential direction with a "L" shape in cross section. With respect to the length plate 64, the rubber plate 60 is bonded at its peripheral portion. In this respect, the rubber plate 60 has a tapered shape at its circumferential portion such that the circumferential portion of the rubber plate 60 extends radially outwardly and axially outwardly (axially downwardly as seen in FIG. 1) from the central portion of the rubber plate 60. The provision of the tapered circumferential portion of the rubber plate 60 is effective to increase the spring stiffness of the rubber plate 60 with respect to the pressure or load applied to the upper surface of the rubber plate 60.

The partition member 56 is disposed in axially intermediate portion of the second mounting member 14 so as to extend in the diametric direction, such that the outer peripheral portion of the width plate 62 of the metallic support plate 58 is fluid-tightly fixed by calking to the axially intermediate portion of the second mounting member 14 together with the flange portion 34 of the lower sleeve 26. In this arrangement, the partition member 56 divides the fluid chamber 54 into two spaces on the axially opposite sides thereof, namely a pressure-receiving chamber 66 partially defined by the elastic body 16 on one side (axially upper side) of the partition member 56 and an equilibrium chamber 68 partially defined by the flexible diaphragm 38 on the other side (axially lower side) of the partition member 56. Upon application of the vibrational load to the elastic mount 10, the pressure of the fluid in the pressure receiving chamber 66 varies due to elastic deformation of the elastic body 16, while the volume of the equilibrium chamber 68 is permitted to vary by displacement of the flexible diaphragm 38.

In the partition member 56, a circumferential rubber wall 70 is bonded by vulcanization to the inner circumferential surface of the length plate 64 of the metallic support member 58 over the entire circumference of the length wall 64. The axially lower end portion of the circumferential rubber wall 70 protrudes axially downwardly from the axially lower end of the length wall 64 by a given axial distance so that the axially lower end face of the circumferential rubber wall 70 is forcedly placed onto the upper end face of the bottom rubber wall 42 bonded to the lower sleeve 26. In this arrangement, the lower sleeve 26 and a metallic support plate 58 are cooperate to define therebetween an annular orifice passage 72 extending along the inner circumferential surface of the lower sleeve 26. As is apparent from FIG. 3, the circumferential rubber wall 70 includes an interception wall 74 which is formed at a circumferential position of the circumferential rubber wall 70 such that the interception wall 74 protrudes radially outwardly from the circumferential surface of the circumferential rubber wall 70 so as to be forcedly fitted on the inner circumferential surface of the lower sleeve 26. Thus, the orifice passage 72 is fluid tightly intercepted by the interception wall 74. On the circumferentially opposite sides of the interception wall 74, there are formed a first communication hole 76 open in the pressure receiving chamber 66, and a second communication hole 78 open in the equilibrium chamber 68. Therefore, the pressure receiving chamber 66 and the equilibrium chamber 68 are held in fluid communication through the orifice passage 72 extending in the circumferential direction having a circumferential length which is substantially equal to a circumference of the lower sleeve 26.

In the engine mount 10 constructed as described above, a pressure of the fluid in the pressure-receiving chamber 66 changes due to elastic deformation of the elastic body upon application of vibrational loads to the engine mount 10, generating a relative pressure difference of the fluid between the pressure receiving chamber 66 and the equilibrium chamber 68. Based on this pressure difference of the fluid, the fluid filling the fluid chamber 54 forcedly flows through the orifice passage 72 between the pressure-receiving chamber 66 and the equilibrium chamber 68. The engine mount 10 of the present embodiment exhibits an excellent vibration damping effect based on resonance or flows of the fluid flowing through the orifice passage. Therefore, the engine mount 10 can be arranged to exhibit excellent vibration damping or isolating effect with respect to a desired frequency band, by suitably tuning the orifice passage 72 by adjusting its length and its cross sectional area. For instance, the engine mount 10 may be arranged to exhibit high-damping effect with respect to low-frequency vibrations such as engine shakes, or alternatively be arranged to exhibit high vibration isolating effect with respect to high-frequency vibrations such as engine idling vibrations. Upon application of high-frequency vibrations having a frequency band higher than the frequency band to which the orifice passage is tuned, the resistance to the fluid flow through the orifice passage 72 significantly increases, leading to a substantially no flow of the fluid through the orifice passage 72. In this case, the rubber plate 60 is elastically deformed so as to absorb the pressure change of the fluid in the pressure receiving chamber 66, effectively avoiding significant increase of the spring stiffness of the engine mount 10, resulting in an excellent vibration damping effect with respect also to the vibrations of high-frequency band.

In the engine mount 10 constructed according to the present invention, the upper sleeve 24 of the second mounting member 14 is arranged to be formed with a constructed part 30 especially in its upper open end, since a portion of the elastic body 16 which is boned to the upper open end portion of the upper sleeve 24 is likely to suffer from problems of concentration of stress and cracking or other defects. The provision of the constricted part 30 makes it possible to increase an area of the surface of the portion of the elastic body, which is bonded to the upper open end portion of the upper sleeve 24, in comparison with the case where the second mounting member has a cylindrical open end portion. Further, the upper open end portion of the upper sleeve 24 has a diameter gradually increasing toward its upper end, thereby effectively easing the stress concentration in the vicinity of the portion of the elastic body 16 which is bonded to the upper open end portion of the upper sleeve 24, resulting in an improved durability of the elastic body 16.

Since the constricted part 30 is formed only at the upper open end portion of the upper sleeve 24, the intermediate portion of the upper sleeve 24 is applied as the cylindrical portion 28 to which the elastic body 16 is also bonded by vulcanization. Thus, the cylindrical portion 28 having a relatively large diameter and the first mounting member 12 are directly and elastically connected with each other via the elastic body 16 interposed therebetween. The provision of the elastic body 16 interposed between the cylindrical portion 28 and the first mounting member 12 permits a desired volume and a sufficiently large effective free length of the elastic body. This results in a further improved durability of the elastic body 16 and a high degree of freedom in selecting a material of for the elastic body 16 and in arranging spring characteristics of the elastic body 16.

On the other hand, the end face of the small-diameter portion of the elastic body 16, which is bonded to the first mounting member 12, is provided with the circumferential fillet 46 integrally formed in its outer peripheral portion, thereby easing the stress concentration on the end face of the small-diameter portion of the elastic body 16. This arrangement is also effective to improve durability of the elastic body 16. In the present embodiment, the axially upper end face of the large-diameter end portion 48 of the elastic body 16, which is bonded to the second mounting member 14, is flush with the upper open end face of the second mounting member 14 (the upper sleeve 24). The elastic body 16 extends axially outwardly from the upper open end face of the second mounting member 14 toward the first mounting member 12 with a diameter gradually decreasing toward the first mounting member 12, that is with the frustoconical shape. In other words, the entire of the free circumferential surface of the elastic body 16 protrudes from the upper open end of the second mounting member 14 in the axially outward direction. This arrangement permits the use of a mold for forming the elastic body 16, which is opened in the direction perpendicular to the axial direction of the engine mount 10, in other words, which consists of a pair of mold halves which are butted together at a parting plane extending in its axial direction of the split mold. In the engine mount 10 of the present embodiment, therefore, the circumferential fillet 46 can be provided in the outer peripheral portion of the end face of the small-diameter portion of the elastic body 16, while the fillet 46 may be formed as an overhang in a mold which is opened in its axial direction.

Figure 4:
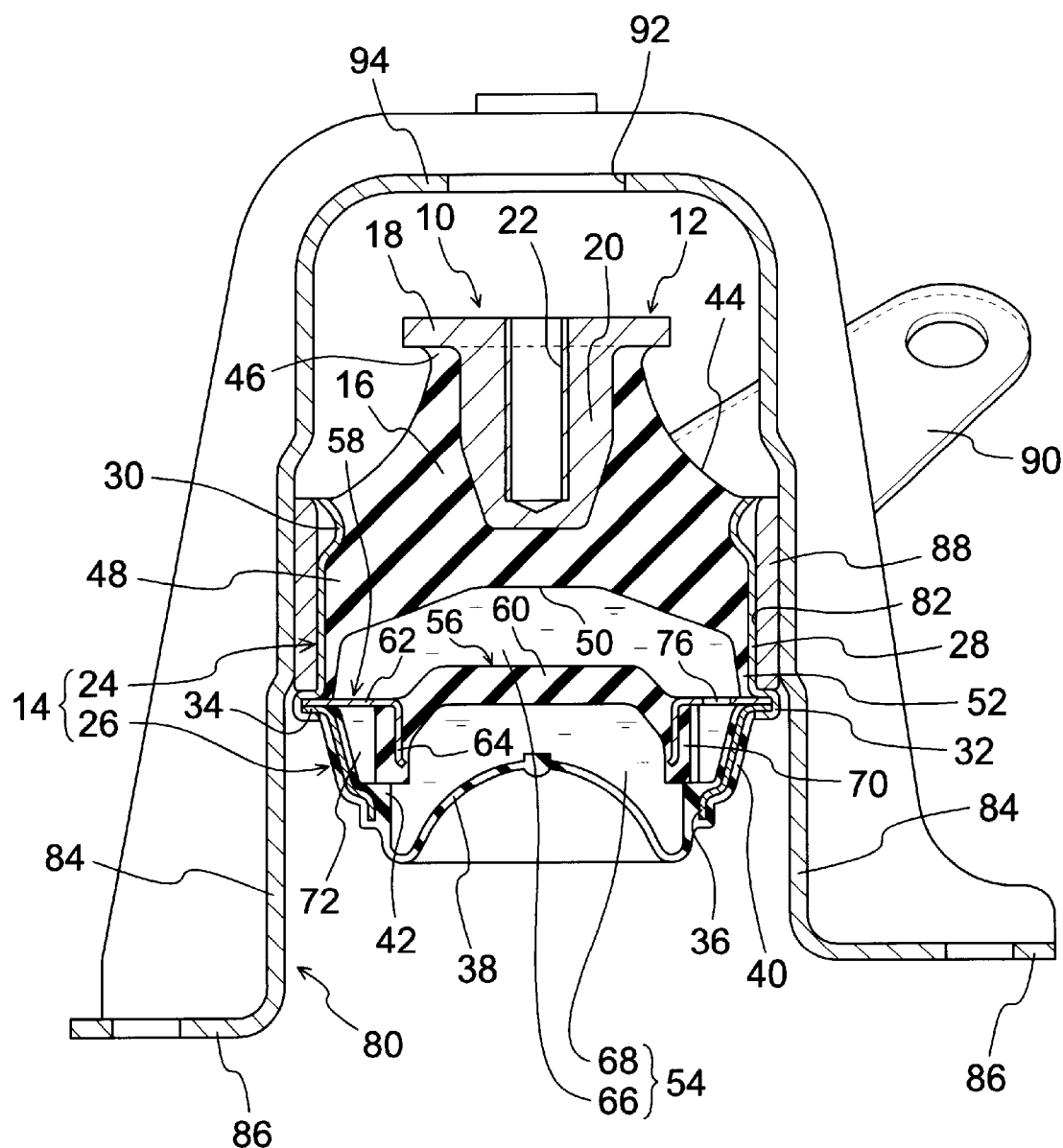
FIG. 4 is an elevational view in axial or vertical cross section of a mounting bracket member and the engine mount of FIG. 1 which is fixed in the bracket member.

Referring next to FIG. 4, there is shown the engine mount 10 which is assembled within a bracket 80 that is directly connected to the body of the automotive vehicle. More specifically, the engine mount 10 is press-fitted in a cylindrical fixing bore 82 formed in the axially intermediate portion of the bracket 80. In this respect, the diameter of the constricted part 30 is made smaller than that of the cylindrical portion 28 in the upper sleeve 24 of the second mounting member 14, so that the constricted part 30 is easily inserted into the fixing bore 82 of the bracket 80, facilitating assembling of the upper sleeve 24 with respect to the bracket 80. Since the constricted part 30 is formed only at the axially upper end portion of the upper sleeve 24, the upper sleeve 24 is forcedly fitted at its cylindrical portion 28 onto the fixing bore 82. That is, the cylindrical portion 28 of the upper sleeve 24 effectively provides a sufficient outer surface area required for being press-fitted in the fixing bore 82.

In the present embodiment, the calking portion 32 is formed in the axially lower end of the upper sleeve 24 so as to protrude radially outwardly from the outer circumferential surface of the upper sleeve 24 by a slight radial distance. Upon assembling the engine mount 10 into the bracket 80, the calking portion 32 is butted on the axially lower open end face of the fixing bore 82, so that the engine mount 10 is effectively positioned with respect to the fixing bore 82 in the axial direction of the bracket 80. The bracket 80 is a generally gate-like shaped metallic member formed by pressing a metallic plate such as a steel plate, such that the bracket 80 includes a top wall portion 94 and a pair of side wall portions 84, 84 formed by bending both sides of the top wall portion 94 so as to extend a direction generally perpendicular to the longitudinal direction of the top wall portion 94 and so as to opposed to each other in the longitudinal direction of the wall portion 94. The end part of each of the side wall portions 84 are bent outwardly so as to form a fixing plate portion 86 at which the bracket 80 is bolted to the vehicle body. The bracket 80 further includes a cylindrical fixing ring member 88 made of a metallic material and having a fixing bore 82. The fixing ring member 88 is fixed by fusion-welding to the side wall portions 84, 84 such that diametrically opposite circumferential positions of the outer circumferential surface of the fixing ring member 88 are fixed to the longitudinally intermediate portions of the side wall portions 84, 84, respectively. A fixing stay 90 is also fixed by fusion welding to a portion of the outer circumferential surface of the fixing ring member 88. The top wall portion 94 is formed with a through hole 92. Through the through hole 92, a fixing bracket (not-shown) fixed on the side of the power unit is bolted to the first mounting member 12, so that the first mounting member 12 is attached to the power unit of the vehicle.

While the present invention has been described above in its presently preferred embodiment, it is to be understood that the invention is not limited to the details of the illustrated embodiment, but may be otherwise embodied.

Figure 5:
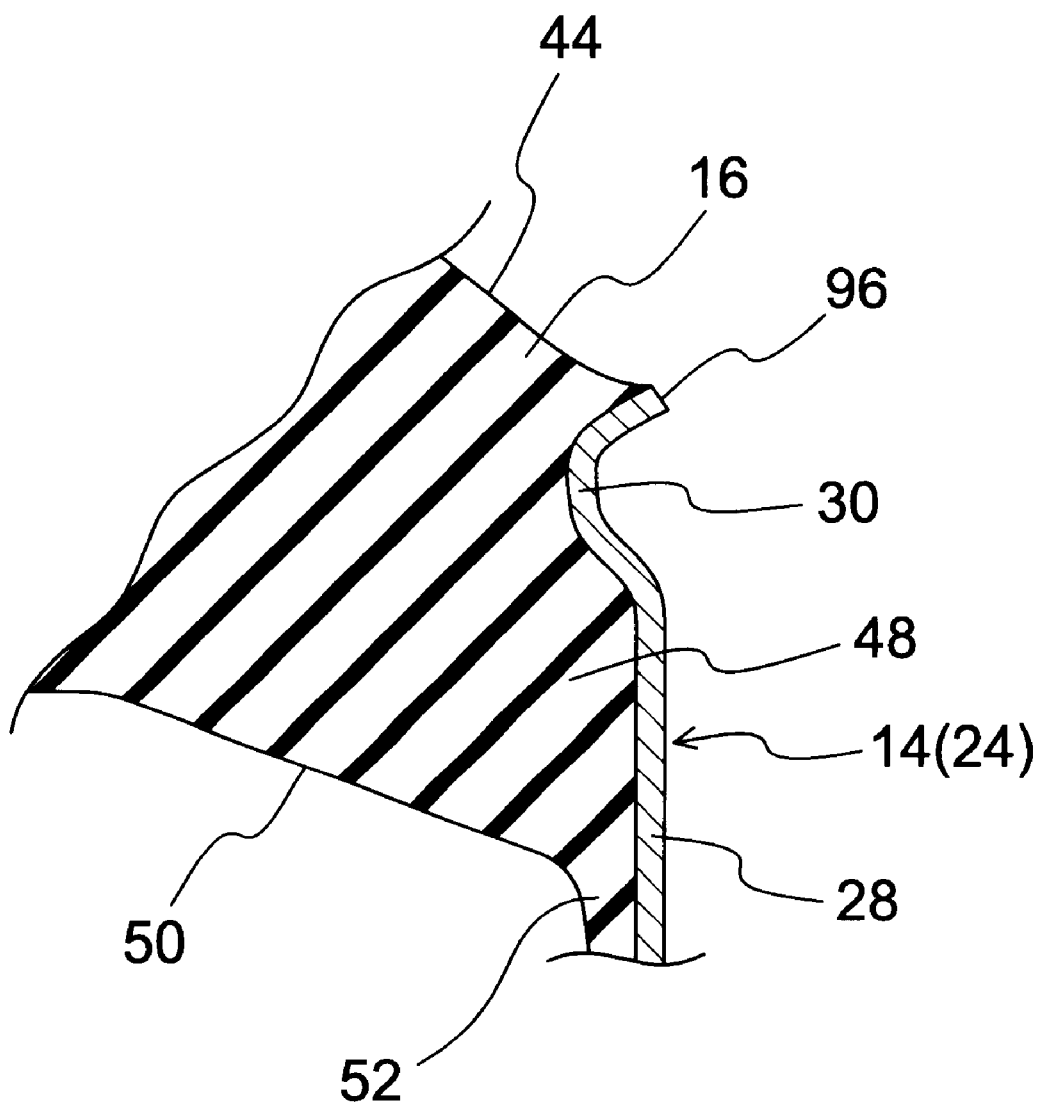
FIG. 5 is a view corresponding to FIG. 2 showing a principal part of an engine mount constructed according to another embodiment of the invention.

For instance, the upper sleeve 24 of the second mounting member 14 is processed by cutting so that the open end face of its constructed part 30 is made a cut surface extending in the direction perpendicular to its axial direction, in the illustrated embodiment. This cutting process is not necessarily required. As shown in FIG. 5, the open end face of the constructed part 30 of the upper sleeve 24 may be formed as a non-cut surface 96, wherein the upper sleeve 24 is processed only by pressing so as to form the constructed part 30 at its upper cylindrical end face.

While the engine mount 10 is press-fitted in the fixing bore 82 of the bracket 80 and is attached to the body of the vehicle via the bracket 80 in the present embodiment, the structure for attaching the engine mount 10 to the body of the vehicle is not particularly limited. For instance, the engine mount 10 may be attached to the vehicle body by using a fixing member such as a fixing plate, which is integrally formed with the second mounting member 14 by fusion-welding.

Figure 6:
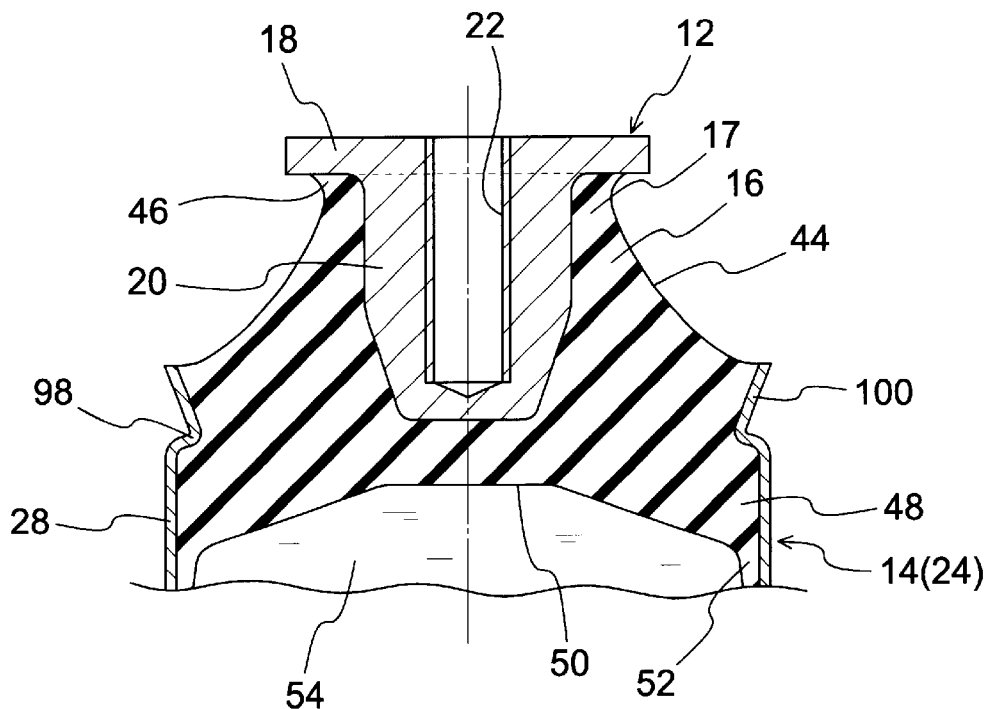
FIG. 6 is a fragmentary enlarged view in axial or vertical cross section showing a principal part of an engine mount constructed according to yet another embodiment of the invention.
Figure 7:
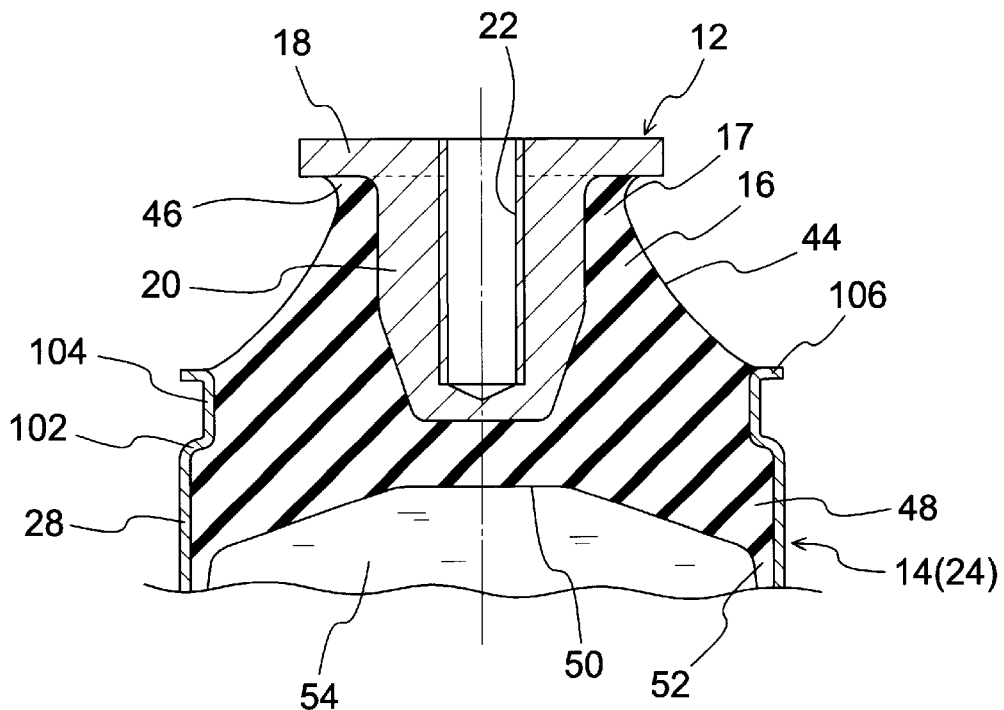
FIG. 7 is a fragmentary enlarged view in axial or vertical cross section showing a principal part of an engine mount constructed according to still another embodiment of the invention.

Further, the configuration of the constricted part 30 formed in the upper open end portion of the second mounting member 14 is not limited to the illustrated embodiment, but may otherwise be embodied. As illustrated in FIG. 6, the constricted part 30 may consists of an inward flange portion 98 as an annular plane portion which extends radially inwardly from the axially upper end of the cylindrical portion 28 of the second mounting member 14, and a tapered cylindrical portion 100 extending radially outwardly and axially outwardly from the inner periphery of the inward flange portion 98, for example. Alternatively, as shown in FIG. 7, the constricted part 30 may consists of an lower flat portion 102 extending radially inwardly from the axially upper end of the cylindrical portion 28 of the second mounting member 14, a small-diameter cylindrical portion 104 extending axially outwardly from the inner periphery of the lower flat portion 102 with a generally constant diameter, and upper flat portion 106 in the form of an annular plate which is formed by bending the axially end portion of the small-diameter cylindrical portion 106 so as to extend radially outwardly from the axially end portion of the small-diameter cylindrical portion 104.

The configuration of the first mounting member 12 is not particularly limited. The fillet 46 formed in the bonding portion of the elastic body 16 with respect to the first mounting member is not essential.

The specific structure of the orifice passage 72 is not particularly limited. The structure of the partition member 56 is not particularly limited and the rubber plate 60 of the partition member 56 does not necessarily required. For instance, the metallic support member 58 may consists of disk-like shaped metallic plate so that the fluid chamber 54 is divided into the pressure receiving chamber 66 and the equilibrium chamber 68, without using the rubber plate 60.

While the vibration damping device according to the illustrated embodiment of the present invention is a fluid-filled engine mount having the fluid chamber 54, the principle of the invention is equally applicable to a solid-type or non-fluid-filled type vibration damping device without a fluid chamber filled with a non-compressible fluid.

While the illustrated embodiment of the vibration damping device takes the form of the engine mount for an automotive vehicle, the principle of the present invention is equally applicable to various other types Of vibration damping devices such as vehicle body mounts and differential mounts for use on an automotive vehicle, and vibration damping devices used for various devices other than those for motor vehicle.

It is to be understood that the present invention may be embodied with various other changes, modifications and improvements, which may occur to those skilled in the art, without departing from the sprit and scope of the invention defined in the following claims:

What is claimed is:

1. A vibration damping device interposed between two members of a vibration system for elastically connecting these two members in a vibration damping manner, said vibration damping device comprising:

a first mounting member and a second mounting member including a cylindrical portion, which are spaced apart from each other such that an open end portion in one of axially opposite ends of said cylindrical portion of said second mounting member is opposed to the first mounting member, and which are attachable to said two members of said vibration systems, respectively;

an elastic body elastically connecting said first and second mounting member such that said elastic body is bonded at a central portion thereof to said first mounting member, at a peripheral portion thereof to an inner circumferential surface of said second mounting member, and such that the elastic body is elastically deformed upon application of a vibrational load to the first mounting member; and a constricted part being integrally formed in said open end portion of said cylindrical portion of said second mounting member such that said constricted part protrudes radially inwardly of said cylindrical portion and extends circumferentially over an entire circumference of said cylindrical portion, and that said constricted part has a maximum outer diameter not larger than that of the cylindrical portion, wherein said peripheral portion of said elastic body being bonded to respective inner circumferential surfaces of said constricted part and said cylindrical portion of said second mounting member so that said constricted part and said cylindrical portion are elastically connected to said first mounting member via said elastic body; and wherein said peripheral portion of said elastic body is bonded to said inner circumferential surface of said second mounting member so as not to extend over an outer circumferential surface across an open end face of said cylindrical portion of said second mounting member.

2. A vibration damping device according to claim 1, wherein said elastic body includes a connecting portion adapted to connect said first and second mounting member and having a circumferential surface serving as a free surface, said free surface having a tapered cylindrical shape extending axially outwardly and radially inwardly from an open end portion of said constricted part of said second mounting member.

3. A vibration damping device according to claim 2, wherein said elastic body has a small-diameter portion and is bonded at an end face of said small-diameter portion thereof to said first mounting member, while said first mounting member has a protruding portion protruding in a radially outward direction thereof from a peripheral portion of said end face of said small-diameter portion of said elastic body, said elastic body further including a circumferential fillet formed in said peripheral portion of said end face of said small-diameter portion thereof so as to extend radially outwardly from said peripheral portion with a curved surface and so as to be bonded to said protruding portion of said first mounting member.

4. A vibration damping device according to claim 1, wherein said first mounting member includes an axially protruding portion which protrudes toward and is embedded in said elastic body such that said elastic body is bonded to said protruding portion.

5. A vibration damping device according to claim 1, wherein said elastic body includes a first and a second axial portion located radially inwardly of said constricted part and said cylindrical portion of said second mounting member, respectively, said first and second axial portions having respective axial lengths: L and M, as measured in a cylindrical cross section taken along a cylindrical plane tangent to a radially inner end portion of said constricted part, which axial lengths: L and M satisfy the following inequality:

$0.5 \leq M/L \leq 3.0$.

6. A vibration damping device according to claim 5, wherein said axial lengths: L and M of the first and second axial portions of said elastic body satisfy the following inequality:

$1.0 \leq M/L \leq 2.0$.

7. A vibration damping device according to claim 1, wherein said constricted part of said second mounting member has an inner circumferential surface which entirely comprises an inclined or a curved surface extending in an axial direction of said cylindrical portion of second mounting member, and which comprises no plane surface extending in a direction perpendicular to said axial direction.

8. A vibration damping device according to claim 7, wherein an open-end face of said constricted part comprises a plane surface extending in a direction perpendicular to said axial direction of said cylindrical portion of said second mounting member.

9. A vibration damping device according to claim 1, wherein said constricted part and an intersection of the constricted part with said cylindrical portion of said second mounting member axially extends over axial lengths thereof with a continuously curved inner circumferential surface having no bending portion.

10. A vibration damping device according to claim 1, wherein said constricted part of said second mounting member comprises an annular plane portion extending radially inwardly from said open end portion of said cylindrical portion of said second mounting member and a tapered cylindrical portion extending radially outwardly and axially outwardly from an inner peripheral portion of said annular plane portion.

11. A vibration damping device according to claim 1, wherein said constricted part of said second mounting member comprises a first annular plane portion extending radially inwardly from said open end portion of said cylindrical portion of said second mounting member, a small-diameter cylindrical portion extending axially outwardly from an inner peripheral portion of said first annular plane portion, and a second annular plane portion extending radially outwardly from an axially outward end portion of said small-diameter cylindrical portion.

12. A vibration damping device according to claim 1, further comprises a fluid chamber formed in an interior space of said cylindrical portion of said second mounting member, said fluid chamber being partially defined by said elastic body and being filled with a non-compressible fluid.

13. A vibration damping device according to claim 1, further comprising a bracket member which is attachable to one of said two members of said vibration system for attaching said second mounting member to said one member of said vibration system, said bracket member including a fixing bore, and said second mounting member being fixed in said fixing bore such that said second mounting member is axially press-fitted in said fixing bore on the side of said constricted part thereof.

14. A vibration damping device according to claim 13, wherein said constricted part of said second mounting member has a maximum outer diameter which is slightly smaller than the outer diameter of the cylindrical portion of said second mounting member.

15. A vibration damping device according to claim 13, further comprises: a calking portion which is integrally formed in an open end portion in an other one of said axially opposite ends of said cylindrical portion of said second mounting member, which is opposite to said constricted part in the axial direction, and which has a diameter larger than said outer diameter of said cylindrical portion of said second mounting member; and a closure member which is fixed at an peripheral portion thereof to said calking portion by calking so as to fluid tightly close said the other open end portion of said cylindrical portion of said second mounting member, thereby forming in an interior space of said cylindrical portion a fluid chamber partially defined by said elastic body and filled with a non-compressible fluid, said second mounting member being positioned with respect to said bracket member in the axial direction thereof such that said calking portion is held in abutting contact with an open end face of said fixing bore of said bracket member.

16. A vibration damping device according to claim 14, further comprising a partition member supported by said second mounting member and adapted to fluid tightly divide said fluid chamber into a pressure-receiving chamber partially defined by said elastic body on one of opposite sides thereof, to which a vibrational load is applied, and an equilibrium chamber partially defined by said closure member on the other opposite surface of said partition member, a volume of which equilibrium chamber is variable based on deformation of said closure member; an orifice passage open at both end thereof in said pressure-receiving chamber and said equilibrium chamber, respectively, for fluid communication between said pressure-receiving and equilibrium chambers.

17. A vibration damping device according to claim 16, wherein the length and cross sectional area of the orifice passage are adjusted to high-damping effect with respect to a predetermined vibration frequency band.

18. A vibration damping device according to claim 17, wherein the predetermined vibration frequency band is a low frequency band which includes low frequency vibrations such as engine shakes.

19. A vibration damping device according to claim 17, wherein predetermined vibration frequency band is a high frequency band which includes high frequency vibrations such as engine idling vibrations.

20. A vibration damping device according to claim 1, wherein the cross sectional area of the elastic body between the first mounting member and the constricted part of the second mounting member is about equal to that of the elastic body between the first mounting member and the cylindrical portion of the second mounting member.

* * * * *